F. FLEMING.
LUBRICATOR.
APPLICATION FILED JAN. 13, 1912.
1,129,187.
Patented Feb. 23, 1915.
2 SHEETS—SHEET 2.
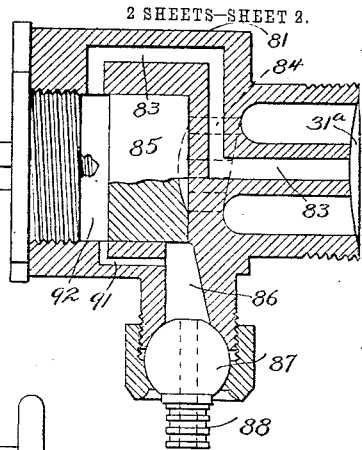
Fig. 6.
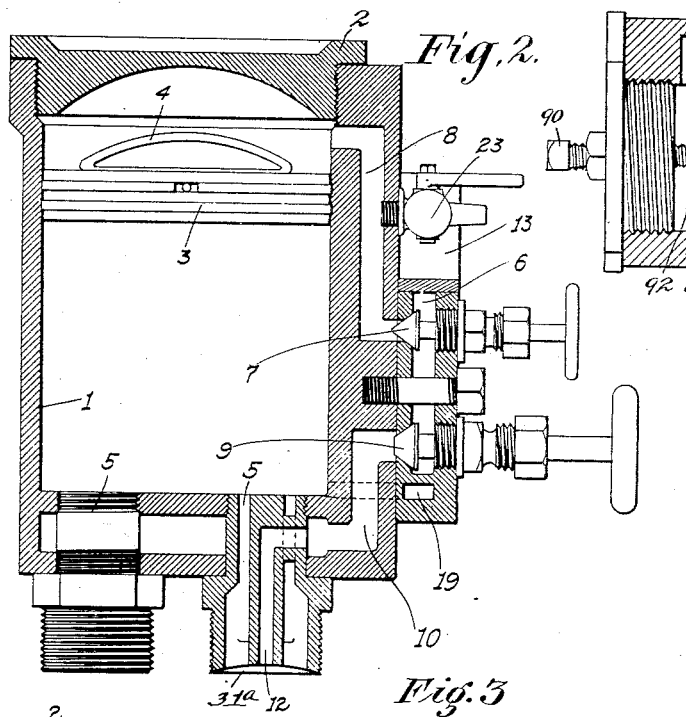
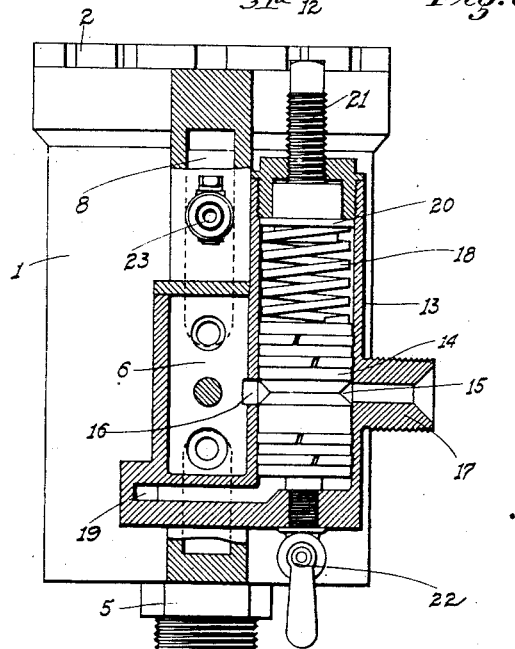
Witnesses
Inventor
Frank Fleming
Attorney

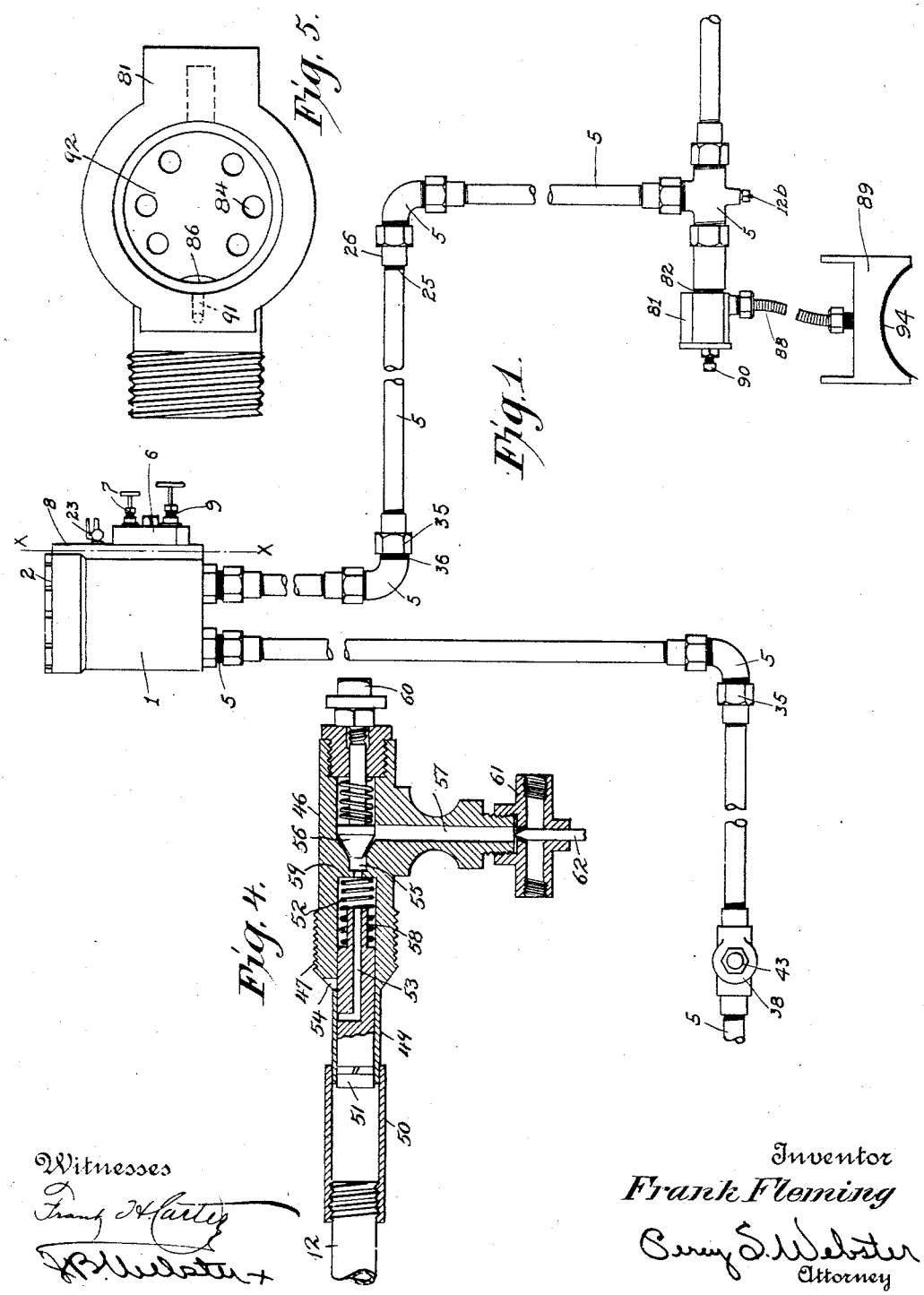

UNITED STATES PATENT OFFICE.

FRANK FLEMING, OF SACRAMENTO, CALIFORNIA.

LUBRICATOR.

1,129,187. Specification of Letters Patent. Patented Feb. 23, 1915.

Application filed January 13, 1912. Serial No. 671,054.

*To all whom it may concern:*

Be it known that I, FRANK FLEMING, of Sacramento, county of Sacramento, State of California, have invented certain new and useful Improvements in Lubricators; and I do declare the following to be a full, clear, and exact description of the same.

This invention relates to improvements in lubricators of all kinds and particularly to lubricators for locomotives, steamboats or similar machines requiring large amount of lubrication for the bearings, journals, and other frictional parts.

The object of the invention is to produce an automatic lubricator for feeding lubricating oil or grease to the parts to be lubricated such lubricator having a steam control mechanism combined with a steam heating mechanism to keep the oil or grease warm to such a degree as to cause it to flow freely.

A further object of the invention is to produce such a combination of elements as will effect the above operation and at the same time permit the oil or grease to be conveyed in an adequate and effective manner to the various parts to be lubricated.

A still further object of the invention is to produce a comparatively simple and inexpensive device and yet one that will be exceedingly effective for the purposes for which it is designated.

These objects I accomplish by such structure and relative arrangement of parts, as will appear from a perusal of the following specification and claims.

In the drawings similar characters of reference indicate corresponding parts in the several views.

Figure 1, is a side elevation of the complete lubricating means. Fig. 2 is a vertical section of the lubricant containing reservoir showing control valves therein. Fig. 3 is a sectional view taken on a line x—x of Fig. 1. Fig. 4 is a sectional view of a control valve adapted to be inserted in the end of the terminal pipe shown in Fig. 1, when the same is used for conveying oil. Fig. 5 is an end view of one of my improved pipe sections which will be used when the device is used for conveying grease. Fig. 6 is a sectional view of the valve used at the terminal end of the pipe sections when grease is to be used.

Referring now more particularly to the characters of reference on the drawings, I first provide a reservoir 1 adapted to receive the oil or lubricant through a cap 2 in its upper end, such reservoir having piston 3 movable therein, such piston 3 being provided with a handle 4 for the purpose of lifting it from the reservoir 1 when it is desired to fill said reservoir with oil or grease. Leading from the said reservoir 1 are one or more pipes 5 adapted to convey the lubricant to the different points, which pipe structure will be hereinafter described.

The numeral 6 designates a steam passageway while 7 is a valve connected between said passageway 6 and a passageway 8 leading from said passageway 6 to the top of reservoir 1 above the piston 3, whereby steam pressure may be admitted against said piston 3 to force it downward and hence force the grease or oil through the pipes 5.

The numeral 9 designates another valve leading from the passageway 6 into a passageway 10 connecting with a steam chamber 11 underneath reservoir 1 and around the pipes 5. The pipes 5 at their juncture with the reservoir 1 are short members cast with an inner central pipe 12 adapted to connect with said steam chamber 11, whereby the steam will pass through said central pipes 12 to keep the oil and grease in the pipes 5 warm in order to keep it flowing freely in any kind of weather. How this steam pipe connection is made throughout the pipe 5 and its connections will be shown fully hereinafter.

In order to prevent too much grease or oil from being forced into the pipes 5, I provide the following control mechanism, to-wit: Connecting with the steam passageway 6 is a cylinder 13 having a piston 14 movable therein, such piston being provided with an annular groove 15 in its sides, such groove being normally in register with the passageway 16 in the side of a passageway 6. The steam passing through said passageway 6 and hence into the reservoir 1 would then pass through a passageway 17 through said groove 15 and said passageway 6 under normal condition. Such normal conditions are maintained by the spring 18 interposed between the piston 14 and the top of the cylinder 13, which spring is of the proper tension to hold the piston 14 in its normal position. When, however, there is too much pressure on the piston 3 all of pipes 5 become congested with the oil or grease, then such oil or grease is forced through a passageway 19 and into the cylinder 13 and against the piston 14, forcing said piston 14 upward against the spring 18. This action moves the said piston 14 to such a position that the groove 15 moves out of register with the passageways 16 and 17, thus shutting the steam off from the passageway 6 and thus relieving the pressure on the top of the piston 3 which provides too much oil or grease to be forced through the pipes 5. The tension or the spring 18 is regulated by a collar 20 movable thereagainst and being operated by the set screw 21.

The numeral 22 designates a draw-off cock from the cylinder 13 while 23 is a smaller cock connected with the passageway 8.

The pipes 5 with their inner heating pipes 12 lead from the reservoir 1 to any point desired and are constructed and provided with joints, elbows, and T's.

At the terminal end of the pipe section, provided oil is used, I provide the following described valve, namely: The numeral 46 designates the valve casing which is provided with a threaded shoulder 47 which screws in the threaded end of the pipe 5, as at 48, and this valve is provided with a sleeve 49 on its end which projects into another sleeve 50 on the terminal end of the pipe 12. Within the sleeve 49 is movable a piston 51 having a spring 52 which holds it normally in its outward position and into an inner passageway 53 out of communication with the passageway 54 in the side of the sleeve 49 adapted to communicate from the pipe 5 into the passageway 53 and thence through the passageway 55 controlled by the spring pressed valve 56 into a passageway 57 leading to the parts to be lubricated. Normally when the device is in operation, the pressure of the steam in the pipe 12 holds the piston 51 backward until the end 58 of the piston 51 abuts against a shoulder 59 in a valve 46 in which position the passageways 54 and 53 are in communication with each other allowing the lubricant to pass through said passageways and through the valve 56 to the passageway 57, and when the steam is shut off at the reservoir, then the spring 52 forces the piston 51 outward thus shutting off such communication and stopping the lubrication as is necessary. The valve 56 has an adjustment nut 60 by which it may be adjusted to permit of any amount of flow desired. On the end of the passageway 57 may be a distributing T-joint 61 to distribute the oil to any number of parts such T-joint 61 having a control valve 62.

When I use grease in the device instead of the previous valve structure described for the use of oil, at the terminal end of the pipe section I provide the following valve structure to-wit: A casing 81 is provided with the threaded end 82 which screws in a pipe section and is provided with a passageway 83 adapted to connect with a pipe 12 and with passageways 84 adapted to connect with a pipe 5. Within the casing 81 is a piston 85 forming a normal closure for the passageways 84, such piston being held in normal position by means of the steam passing through a passageway 83 and against said piston, as shown in Fig. 13. The pressure of the grease passing through said passageways 84 forces said piston out of the way and moves through a passageway 86 and through a ball and socket valve 87 into a flexible pipe 88 and thence to any desired point. The travel of the piston 85 is controlled by a set screw 90 and small bleed hole 91 leading from the piston chamber 92 to a passageway 86, thus mixing the steam slightly with the grease in order that it may thoroughly mix with the same and cause it to flow freely down through the flexible pipe 88.

From the foregoing description it will readily appear that I have produced such an oiler as substantially fulfils the objects of the invention, as set forth herein, and one which involves certain novel features of construction and arrangement of parts as will greatly facilitate an automatic oiling of frictional parts. This will be a great advantage on boats and other places where there are a great many almost inaccessible bearings and frictional parts which must be continually lubricated.

While this invention sets forth in detail the proper form or construction of the invention, still in practice such deviations from such detail may be resorted to as do not depart from the spirit of the invention.

Having thus described my invention, what I claim as new and useful, and desire to secure by Letters Patent is:

1. The combination of a lubricator comprising a reservoir, a steam and lubricant carrying pipe line leading from said reservoir and comprising inner and outer passageways and an outlet valve, such outlet valve comprising a casing having an inner and outer passageway communicating with the inner and outer passageways of said pipe line, a plunger controlling one of said passageways, such plunger being adapted to be actuated by the material passing through the other of said passageways, as described.

2. In a fluid pressure operated lubricator, a lubricant reservoir, a member mounted on the reservoir provided with a steam chamber having valve controlled inlet and outlets, a steam chamber in the bottom wall of said reservoir, a passageway in the wall of the reservoir connecting the said last named steam chamber and one of the said steam outlets, and a lubricant outlet pipe extending through the bottom of said reservoir and having a plurality of passageways therein, one of said passageways terminating in the reservoir and the other of said passageways terminating in the last named steam chamber.

3. In a heating device for a lubricator the combination of a lubricant reservoir, a steam chamber in the bottom wall of said reservoir, a steam inlet for the steam chamber, an outlet member for the reservoir passing through the bottom wall and the said steam chamber, the said outlet member having two passageways one terminating in the lubricant reservoir and the other in the steam chamber.

4. In a lubricator, a pipe leading therefrom, said pipe having a lubricant passageway and a steam passageway, a piston valve adapted to be operated by the pressure medium in one passageway to control the passage of the pressure medium in the other passageway.

5. In a lubricator, a pipe leading therefrom, said pipe having a lubricant passageway and a steam passageway, a piston valve adapted to be operated by the pressure medium in one passageway to control the passage of the pressure medium in the other passageway, and a resilient control means for holding said piston in position to normally close said lubricant passageway when the lubricator is in inoperative position, as described.

6. In a lubricator, a pipe with fittings leading therefrom, said pipe having a lubricant and a steam passageway, a piston valve adapted to be operated by the pressure medium of one passageway to control the passage of the pressure medium in the other passageway, a resilient control means for holding said piston in position to normally close said lubricant passageway when the lubricator is in inoperative position, and an adjustment to control the outlet of said lubricant, as described.

In testimony whereof I affix my signature in presence of two witnesses.

FRANK FLEMING.

Witnesses:
PERCY S. WEBSTER,
JOSHUA B. WEBSTER.